(12) United States Patent
Fitzpatrick et al.

(10) Patent No.: US 6,856,448 B2
(45) Date of Patent: Feb. 15, 2005

(54) SPATIAL LIGHT MODULATOR

(75) Inventors: Glen Arthur Fitzpatrick, Edmonton (CA); Daniel Gelbart, Vancouver (CA)

(73) Assignee: Creo Inc., Burnaby (CA)

( * ) Notice: Subject to any disclaimer, the term of this patent is extended or adjusted under 35 U.S.C. 154(b) by 0 days.

(21) Appl. No.: 10/730,140

(22) Filed: Dec. 9, 2003

(65) Prior Publication Data

US 2004/0114210 A1 Jun. 17, 2004

Related U.S. Application Data

(63) Continuation-in-part of application No. 10/689,719, filed on Oct. 22, 2003, which is a continuation-in-part of application No. 09/816,751, filed on Mar. 26, 2001, now Pat. No. 6,661,561.

(51) Int. Cl.[7] .................. G02B 26/00; G02B 26/02; G02F 1/29
(52) U.S. Cl. .................. 359/291; 359/298; 359/230
(58) Field of Search .................. 359/222, 224, 359/230, 290, 291, 298

(56) References Cited

U.S. PATENT DOCUMENTS

| | | | |
|---|---|---|---|
| 4,229,732 A | 10/1980 | Harstein et al. | 340/815.4 |
| 4,441,791 A | 4/1984 | Hornbeck | 359/295 |
| 5,172,262 A | 12/1992 | Hornbeck | 359/223 |
| 5,311,360 A | 5/1994 | Bloom et al. | 359/572 |
| 5,517,359 A | 5/1996 | Gelbart | 359/623 |
| 5,610,757 A | 3/1997 | Ji et al. | 359/295 |
| 5,661,592 A | 8/1997 | Bornstein et al. | 359/291 |
| 5,748,172 A | 5/1998 | Song et al. | 345/111 |
| 5,768,009 A | 6/1998 | Little | 359/293 |
| 5,867,302 A | 2/1999 | Fleming | 359/291 |
| 5,926,309 A | 7/1999 | Little | 359/293 |
| 5,999,303 A | 12/1999 | Drake | 359/224 |
| 6,025,951 A | 2/2000 | Swart et al. | 359/245 |
| 6,028,689 A | 2/2000 | Michalicek et al. | 359/224 |
| 6,307,663 B1 | 10/2001 | Kowarz | 359/231 |
| 6,445,502 B1 | 9/2002 | Islam et al. | 359/571 |
| 6,639,722 B2 | 10/2003 | Amm et al. | 359/577 |
| 2001/0028756 A1 | 10/2001 | Flanders et al. | 385/17 |
| 2002/0031305 A1 | 3/2002 | Ticknor et al. | 385/48 |
| 2003/0142383 A1 * | 7/2003 | Nanjyo et al. | 359/224 |

OTHER PUBLICATIONS

Bloom, D.M. "The Grating Light Valve: revolutionizing display technology." Proceedings of SPIE, vol. 3013, pp. 165–171.

* cited by examiner

Primary Examiner—Georgia Epps
Assistant Examiner—William Choi

(57) ABSTRACT

A deformable mirror element with a high natural frequency has elongate ribbons attached along a longitudinal portion thereof to a support. The ribbon is transversely slit to divide each ribbon into at least two individual wing portions. The wing portions extend laterally from the support and are capable of deforming in response to a force applied to the wing. The deformable mirror element is used in a light valve for modulating one or more beams of incident light. The high natural frequency of the element ensures that the light valve is useful in applications requiring fast response time.

28 Claims, 10 Drawing Sheets

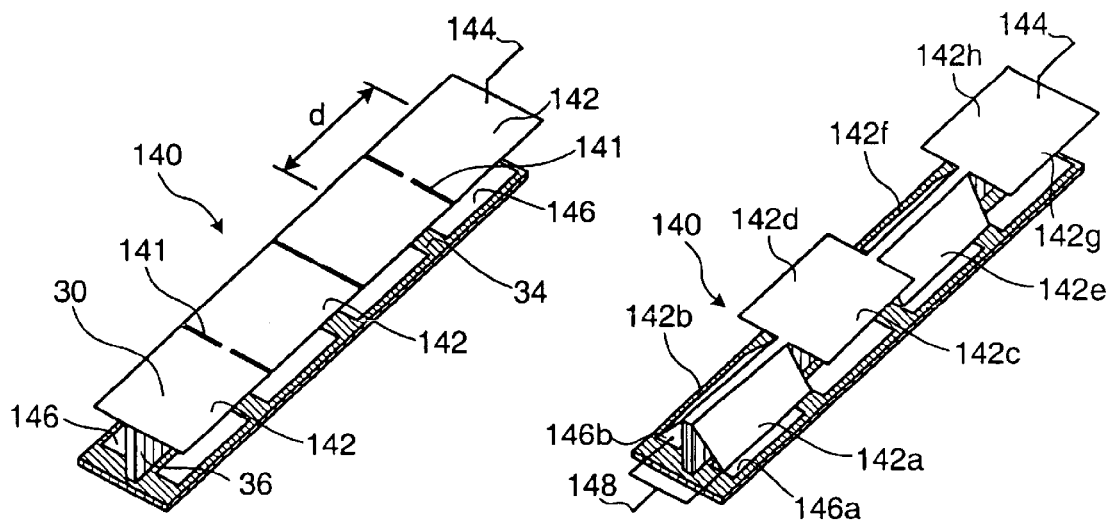
FIG. 7-A    FIG. 7-B
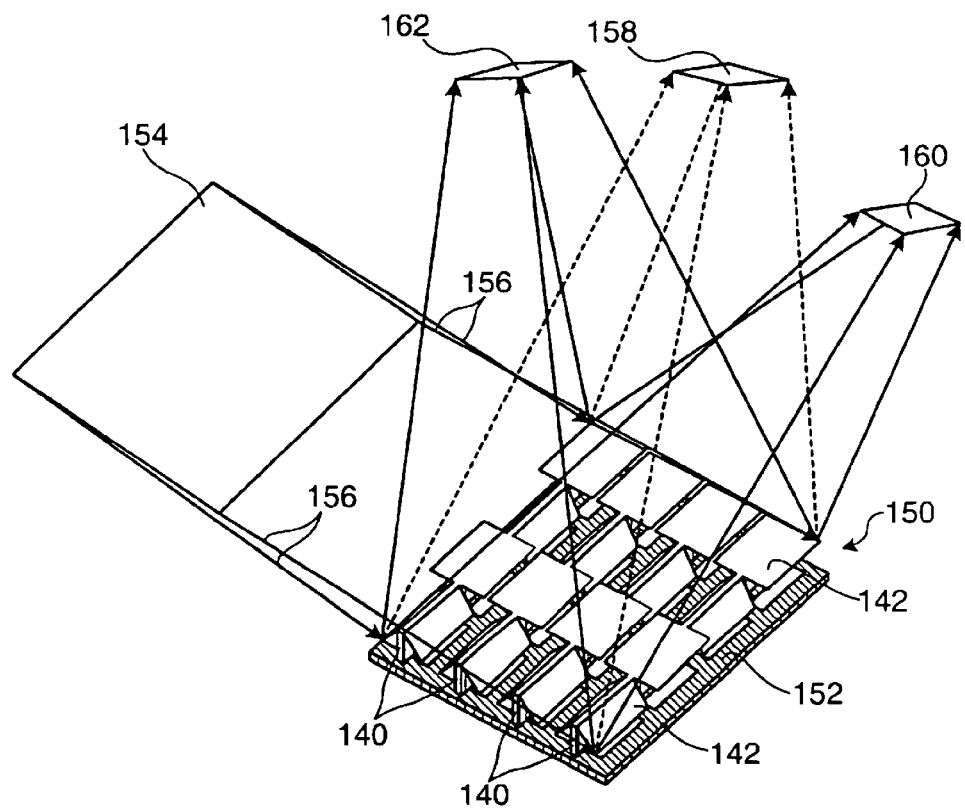
FIG. 8

SPATIAL LIGHT MODULATOR

RELATED APPLICATIONS

This is a continuation-in-part of U.S. application Ser. No. 10/689,719 filed on 22 Oct. 2003 entitled "High Frequency Deformable Mirror Device" which is a continuation-in-part of U.S. application Ser. No. 09/816,751 filed on 26 Mar. 2001 now U.S. Pat. No. 6,661,561, also entitled "High Frequency Deformable Mirror Device".

TECHNICAL FIELD

The invention relates to the modulation of light beams and in particular, to modulating light using a light valve.

BACKGROUND

Spatial light modulators, also commonly referred to as light valves are useful in many different fields. One particular field in which these devices have made an impact is the printing industry. Light valves are used in computer-to-plate imaging devices for modulating the illumination produced by a laser in order to imagewise expose a printing plate. In the imagewise exposure of printing plates pixel size and resolution are important parameters. Computer-to-plate systems make great demands upon the performance of light valves. The limits on optical power handling, switching speed and resolution are continually under pressure due to the operational demands of the printing industry. The most common lasers used for plate imaging have near-infrared wavelengths.

Light valves, or linear and two-dimensional arrays of light valves, are typically employed to produce a large number of individually modulated light beams.

Another field that stands to benefit from this technology is that of optical communications where there is a need for devices that may be used to switch, modulate, or process light signals.

One particular subset of light valves operate by controlling the reflection of an incident light beam from a microminiature (MEMS) deformable mirror. The term MEMS (Micro-Electro-Mechanical Systems) describes technology that forms mechanical devices such as mirrors, actuators or sensors in a substrate. MEMS devices are typically formed by selectively etching a semiconductor substrate such as a silicon wafer. Prior art MEMS light valves can be generally divided into three types:

a. cantilever or hinged mirror type light valves which re-direct a light beam when the mirror is tilted. A well-known example in this category is the Digital Micromirror Device (DMD) developed by Texas Instruments of Dallas, Tex.;

b. membrane light valves where a flat membrane is deformed into a concave or spherical mirror, thus changing the focal properties of the light beam; and, c. grating light valves which diffract the light by forming a periodic physical grating pattern in a reflective or transparent light valve substrate. A well-known example in this category is the Grating Light Valve developed by Silicon Light Machines of Sunnyvale, Calif. and described in Bloom, Proc. SPIE—Int. Soc. Opt. Eng. (USA) 20 vol. 3013 p.165–p.171.

Considerable effort has been invested in the development of MEMS light valves. Significant technical advances have been made, particularly in improving the fabrication processes to obtain better yields. However, a number of central limitations remain in respect of MEMS devices.

A major disadvantage of the hinged or cantilevered mirror type devices is the comparatively slow response time for mirrors any larger than a few square $\mu$m in area. These devices operate by tilting a small mirror to deflect an incident beam. Typically, response times are of the order of 10 microseconds. This is due to the low natural frequency of a cantilever mirror and the large deflection required to provide sufficient spatial separation between a deflected and undeflected beam. Typical cantilever mirrors are between 5 and 10 microns long and require the tip to move between 1 and 5 microns in order to deflect the light through an angle of 10 degrees.

U.S. Pat. No. 4,441,791 to Hornbeck describes a membrane light valve. Membrane light valves have the advantage of somewhat faster response times. However, they are difficult to fabricate. The membrane is supported around its periphery making it difficult to form the cavity under the membrane by micromachining, which is the most cost effective fabrication method for light valves.

FIGS. 1a, 1b and 1c schematically depict three prior art modes of operation of deformable mirror devices of the deflection type. FIG. 1a shows a tilting mirror device having a rigid mirror 10, which remains essentially planar while it tilts about axis 12, typically on torsion hinges (not shown). FIG. 1b shows the simple cantilever type of elongate ribbon 14, which has considerably greater length than width and flexes about a transverse axis 16. Ribbon 14 is attached at one end to fixture 18. FIG. 1c shows a deformable mirror device of the type described in U.S. Pat. No. 5,311,360 to Bloom. This device has a ribbon 20 attached to fixtures 24 at ends 26 (one fixture not shown for the sake of clarity). Ribbon 20 can be flexed into a concave shape about axis 22.

All of the movable mirror elements depicted in FIGS. 1a, 1b and 1c share the problem of relatively low natural frequencies. This results in poor response times. The natural frequency of the element 30 shown in FIG. 1c may be improved by making the ribbon shorter but this makes the element more sensitive to the alignment of the incident light and requires increasingly higher voltage to actuate.

SUMMARY OF THE INVENTION

In a first aspect of the present invention a deformable mirror element for modulating an incident beam of light comprises a substrate and an elongate support extending along the substrate and projecting outwardly therefrom. A ribbon member is attached to the elongate support along a longitudinal portion of the ribbon member and it extends transversely from the elongate support. At least one slit is formed transversely in the ribbon member, the slit for dividing the ribbon member into at least two reflective wing portions, the wing portions being elastically deformable towards the substrate on application of an actuation force.

In another aspect of the present invention a light valve, comprising an array of deformable mirror elements as defined above, are formed on a common substrate. An electrical connection is provided to each of the deformable mirror elements for applying the actuation force thereto.

In yet another aspect of the present invention an apparatus for selectively deflecting a light beam comprises at least one row of spaced-apart deformable mirror elements as defined above. The mirror elements are arranged with their elongate supports parallel to one another and extending substantially transversely to the row.

In another aspect of the present invention a method for modulating light involves providing a plurality of arrayed deformable mirror elements as defined above. Light is directed onto the wing portions to provide a plurality of reflected light beams. Selected ones of the wing portions are elastically deformed by applying an actuation force thereto. The reflected light from the wing portions is spatially filtered to provide a plurality of modulated light beams.

For an understanding of the invention, reference will now be made by way of example to a following detailed description in conjunction with the accompanying drawings.

BRIEF DESCRIPTION OF THE DRAWINGS

In drawings which illustrate by way of example only preferred embodiments of the invention:

FIG. 3b is a sectional view taken along line 3a—3a in FIG. 3a;

FIG. 3c is a sectional view taken along line 3b—3b in FIG. 3a;

FIG. 3d is a sectional view taken along line 3d—3d in FIG. 3a;

FIGS. 7-A & 7-B are perspective views of another embodiment of the invention;

FIG. 8 is a perspective view of an array of deformable mirror elements; and

DESCRIPTION

FIGS. 2a–2d depict a deformable mirror element 28 according to an embodiment of the invention. For the sake of clarity, a single deformable mirror element 28 is shown. Light modulators according to the invention may include a multiplicity of deformable mirror elements arranged to provide a linear or two-dimensional addressable array. Fabrication methods for deformable mirror elements are described in detail in U.S. Pat. No. 5,311,360 to Bloom et. al. and U.S. Pat. No. 5,661,592 to Bornstein et. al. Such methods may be adapted to fabricate a deformable mirror device according to this invention.

Figure 1A:
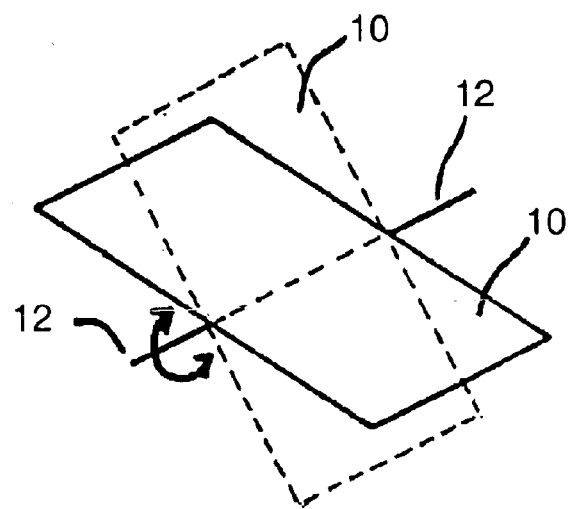
FIGS. 1a, 1b and 1c are perspective views of three prior art mirror elements.
Figure 1B:
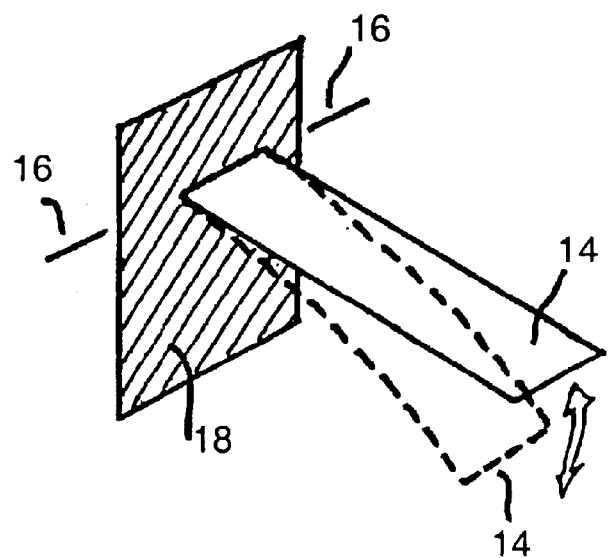
Figure 1C:
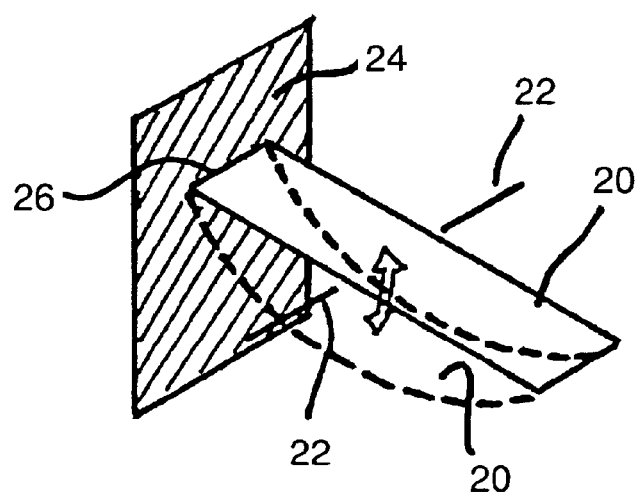
Figure 2A:
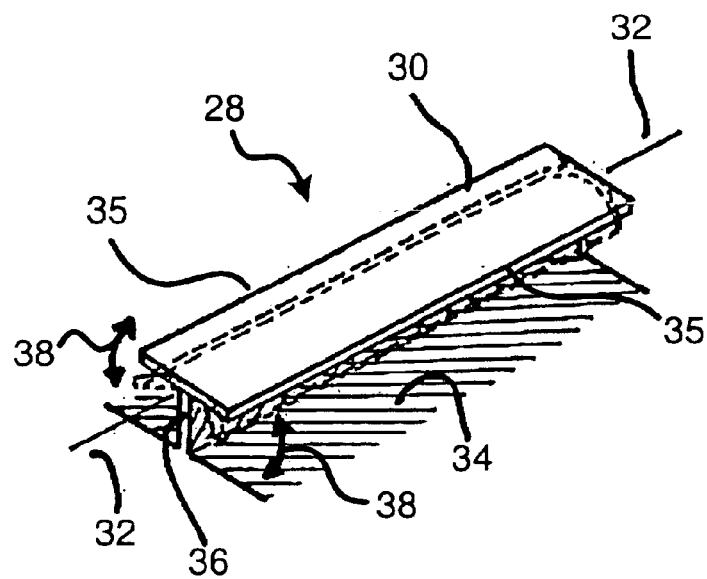
FIG. 2a is a perspective view of a deformable mirror element embodiment according to the present invention.

Referring now to FIG. 2a, deformable mirror element 28 is fabricated on a silicon substrate 34. A pedestal 36 formed on the substrate supports an elongate ribbon member 30 along its longitudinal axis 32. Ribbon member 30 has unsupported laterally extending portions, which form a pair of freely extending wings 35. Each wing 35 has a long side attached to pedestal 36. Wings 35 are elastically deformable in the direction of arrows 38. Each wing 35 has a length parallel to pedestal 36 that is significantly greater than its width in a direction transverse to pedestal 36. Mirror element 28 is T-shaped in cross section. In some embodiment wings 35 have lengths parallel to pedestal 36, which are at least three times their widths transverse to pedestal 36. In some other embodiments the lengths of wings 35 are at least 5, 10 or 15 times their widths.

Figure 2B:
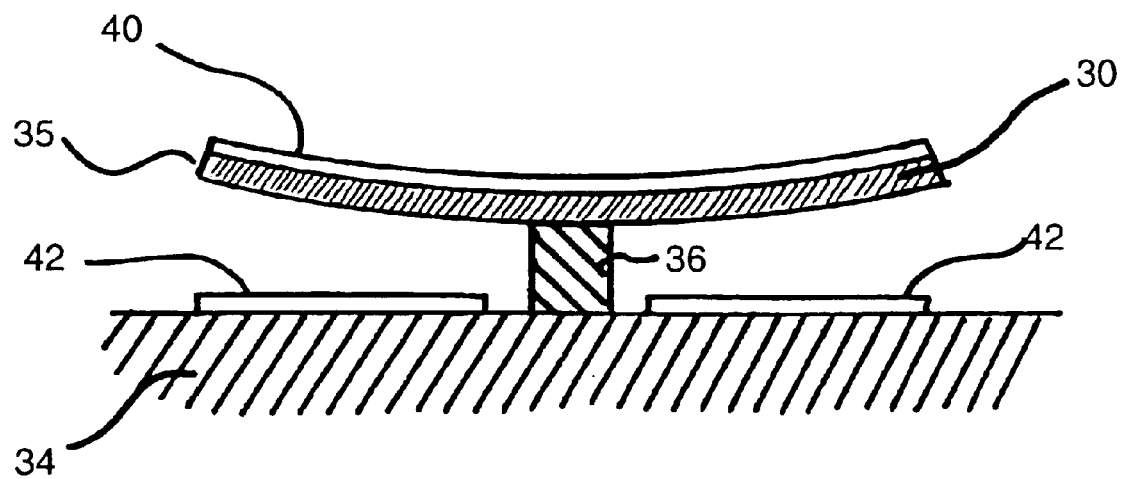
FIG. 2b is a transverse sectional view of the deformable mirror element of FIG. 2a in the un-energized state.

FIG. 2b shows a single deformable mirror element 28 in its un-energized state. A reflective layer 40 is provided on the upper surface of ribbon member 30. In this embodiment, reflective layer 40 is a layer of an electrically conductive material. For example, layer 40 may comprise a layer of a metal such as aluminum, or another reflective and electrically conductive material. When layer 40 is both reflective and electrically conductive, layer 40 can function simultaneously as a conductive electrode and a reflector although this is not mandated. A pair of electrodes 42 are provided on substrate 34 adjacent with the undersides of wings 35. Electrodes 52 may, for example, comprise pads of a suitable metal, such as aluminum or gold.

For each wing 35, layer 40 (functioning as a conductive top electrode) and the corresponding electrode 42 constitute the spaced-apart plates of a capacitor. In the un-energized state depicted in FIG. 2b no voltage is applied between electrodes 40 and 42 and ribbon member 30 assumes an upward curvature due to commonly-encountered inter-layer stresses resulting from the fabrication process. The extent and even the direction of this curvature may be somewhat controlled by modifying deposition process. The un-energized state shown in FIG. 2b is not directly used as an operational state in this particular embodiment.

Figure 2C:
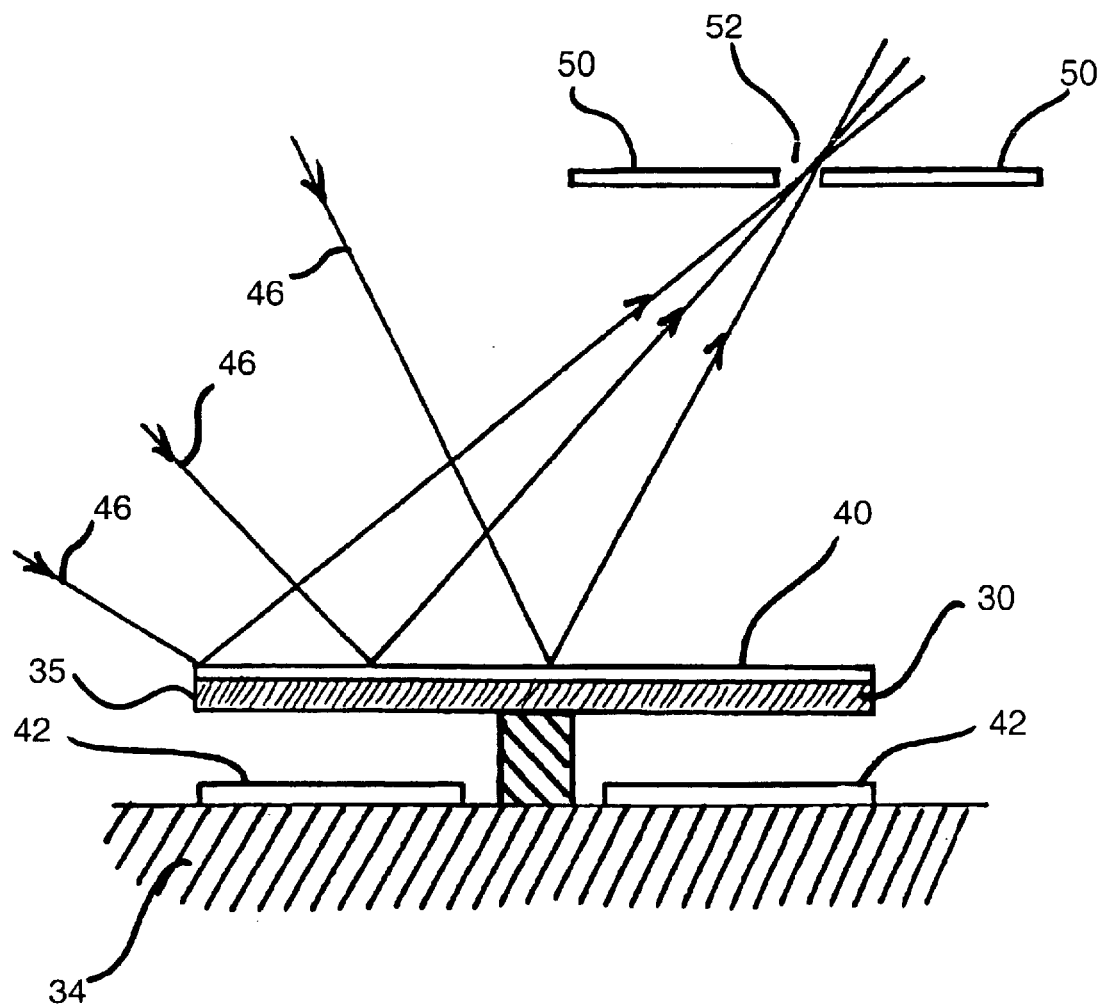
FIG. 2c is a transverse sectional view of the deformable mirror element of FIG. 2a in the un-activated state.
Figure 2D:
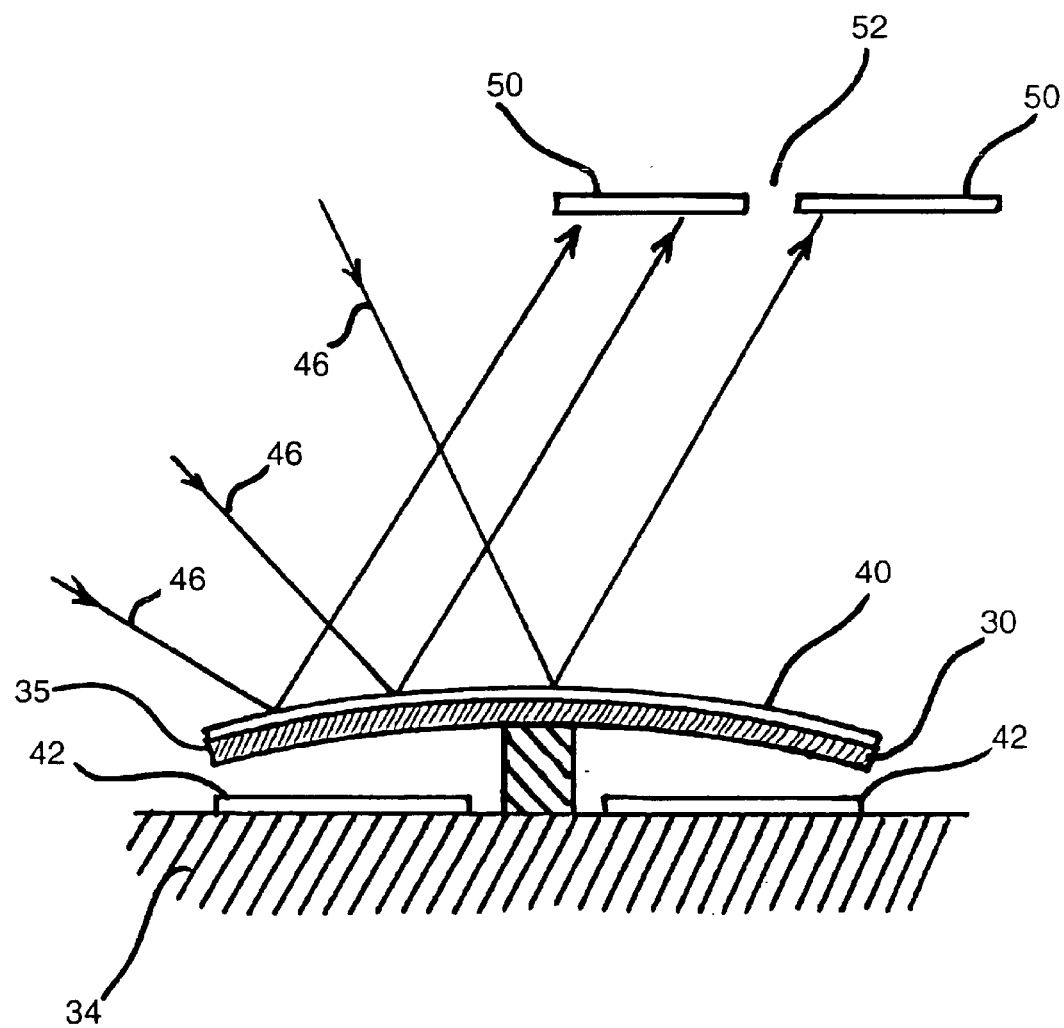
FIG. 2d is a transverse sectional view of the deformable mirror element of FIG. 2a in the activated state.

As shown in FIG. 2c, the application of a voltage between electrodes 42 and electrode layer 40 establishes an electrostatic field between the electrodes resulting in an attractive force therebetween. The force pulls wings 35 of ribbon member 30 toward electrodes 42. The voltage level that results in the wings 35 assuming the generally flat condition shown in FIG. 2c is termed the bias voltage. The bias voltage may be determined empirically. The resulting flat condition is referred to as the un-activated state to distinguish it from the un-energized state shown in FIG. 2b. FIG. 2d shows mirror element 28 in its actuated state. Under application of a voltage exceeding the bias voltage, wings 35 bend further toward substrate 34. For deformations of ribbon member 30 that are small in comparison to the transverse dimension of wings 35, the curvature of ribbon member 30 is essentially cylindrical. For larger deformations, corresponding to increasing applied voltage, the curvature may be more accurately described by a hyperbolic cosine function. As the voltage is further increased, a point is reached where the electrostatic force due to the applied voltage overcomes the restoring force due to the resilience of ribbon member 30. This results in "snap down" wherein the freely extending wings 35 of ribbon member 30 deform until they touch electrode 42 or substrate 34. Snap down occurs because electrostatic force increases quadratically with electrode gap while the restoring force only increases linearly with deformation. Snap down is well known to practitioners in the field of MEMS devices.

An advantage of illustrated embodiments of this invention is that an elongate ribbon member is mechanically stiff with respect to deformations about its longitudinal axis. This results in a high natural 25 frequency. In some embodiments wings 35 have natural frequencies of vibration in excess of 500 KHz. In other embodiments the natural frequencies of wings 35 exceed 1.0 MHz or even 3.0 MHz. In contrast, both stiffness and natural frequency are reduced if the deformation occurs about the transverse axis as in prior art structures. Structures having low natural frequencies have slower response times.

In a first mode of operation as a light valve, deformable mirror element 28 is selectively actuated between the states shown in FIGS. 2c and 2d. The deformation of the ribbon member can spatially modulate incident light. In the embodiment shown, incident light rays 46 are already convergent prior to impinging on reflective surface 40. In the un-activated state shown in FIG. 2c rays 46 are reflected by layer 40 on the generally flat ribbon member 30 to converge at aperture 52 in an aperture stop plate 50. In this manner light rays 46 are transmitted through aperture 52 to some target, such as an imaging medium (not shown).

In switching to the activated state shown in FIG. 2d ribbon member 30 undergoes a generally cylindrical deformation. The now curved reflective layer 40 on ribbon member 30 defocuses incident rays 46 so that a majority of the light is absorbed by aperture stop plate 50. Only a small fraction of the incident light leaks through aperture 52 to reach the target. The leakage light represents a reduction in the achievable contrast between the actuated and un-actuated states. The size of aperture 52 is chosen as a trade off between contrast and transmission efficiency. A smaller aperture may reduce the leakage light in the actuated state but may also reduce the transmitted light in the un-actuated state. In practice, a good choice is to select an aperture size comparable to the diffraction limit of the mirror formed by reflective layer 40 in its actuated state.

In an alternative mode of operation, a group of deformable mirror elements may be arranged in a row to provide a grating light valve channel. FIGS. 3a to 3d show a light valve device 60 having four adjacent deformable mirror elements that collectively provide a controllable diffraction grating channel. Each ribbon member 30 is supported by a pedestal 36 and has a pair of freely extending wings 35. Pedestals 36 are parallel to one another and extend transversely to the direction of the row. A common electrode 42 is formed on the underside of substrate 34. As described above, the application of a bias voltage brings ribbons 30 into a flat un-actuated state as depicted in FIG. 3b.

FIG. 3b shows device 60 in its un-actuated state with reflective layer 40 acting as a generally planar distributed reflecting surface. A light wavefront 70 incident on the device in a direction 72 is simply reflected back in direction 74. Preferably deformable mirror elements are closely spaced. The edges of wings 35 of adjacent deformable mirror elements are spaced apart by a narrow gap in the range of 0.25 µm to 2.0 µm in some embodiments. A narrower gap corresponds to better efficiency since less light is lost in the gap. It is advantageous to reduce the gap as much as possible while avoiding electrical shorting between adjacent electrodes. On the other hand, if it is required to increase the speed of the device, too small a gap may result in air entrapment below the ribbon, which may limit the speed increase.

Figure 3A:
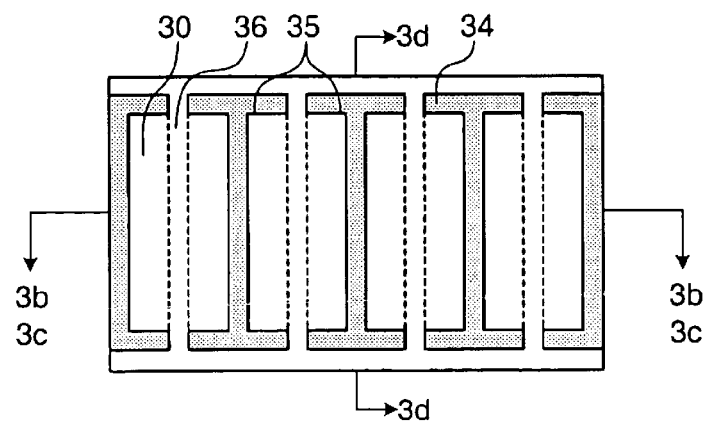
FIG. 3a is a plane view of an alternative embodiment of the present invention.
Figure 3B:
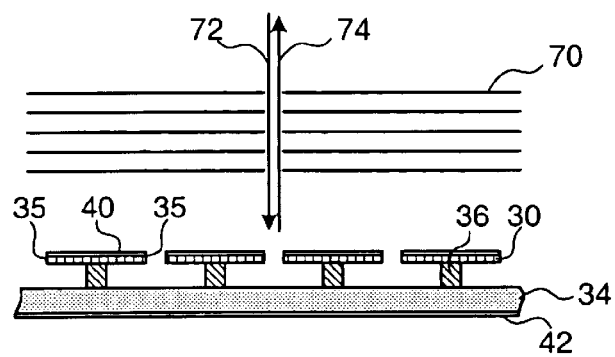
Figure 3C:
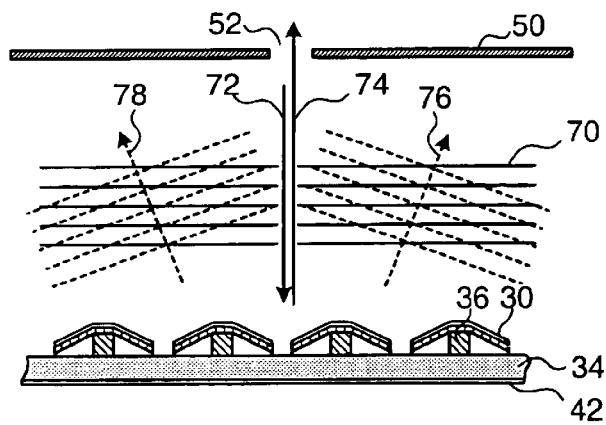
Figure 3D:
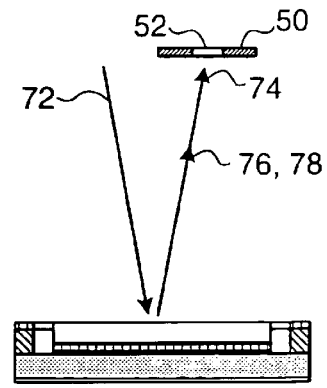

On application of a voltage between electrode layer 40 and common electrode 42, the device switches into the actuated state shown in FIGS. 3c and 3d. In this configuration wings 35 are deformed to "snap down" to substrate 34 forming a periodic grating. Incident wavefront 70 undergoes diffraction, forming first order diffracted beams in directions 76 and 78, along with higher order diffracted beams (not shown). The zero order reflection 74 is depleted by the diffraction into the higher orders. Aperture 52 is positioned transmit the zero order beam 74 while beams 76 and 78 are blocked by aperture stop 50, thus applying a modulation to beam 74.

Alternatively, if higher contrast is required, zero order beam 74 may be blocked and one of the first order beams may be used, albeit at lower overall efficiency. In the further alternative two or more first and higher order beams may be combined into a modulated output 30 beam. Suitable combining schemes are known in the art wherein the higher orders are collected and combined. Such schemes can improve efficiency at the cost of further complexity. Configuring the light valve to modulate the zero order beam is often simple and adequate as long as the contrast is sufficient, which it is for many computer-to-plate imaging applications.

The device shown in FIG. 3a may be longitudinally arrayed to provide a plurality of independent channels each comprising a plurality of deformable mirror elements arranged as a grating light value. When illuminated by an extended line source, such a device is 10 useful as a multi-channel light valve for imaging applications. Each channel may be operated independently to control a longitudinal portion of the line, producing a plurality of independently controllable imaging beams.

The apparatus described above spatially blocks light when the deformable mirror elements are in their activated states as depicted in FIGS. 2d and 3c. Such an apparatus is said to operate in the "brightfield" mode. Alternatively, apparatus using reflective elements according to the invention may be configured to operate in a dark field 20 or Schlieren mode. The apparatus of FIGS. 2c and 2d, could be modified to operate in dark field mode by removing aperture stop 50 and placing a blocker in the place of the aperture 52. In the un-actuated state shown in FIG. 2c, the light is focused onto the blocker and is thus not transmitted. In the activated state shown in FIG. 2d, most of 25 the light is transmitted past the blocker and is used as the modulated beam.

Similarly, for the diffraction grating embodiment shown in FIG. 3c by blocking the zero order beam 74 and all but one of the diffraction orders, a single modulated beam is transmitted. The advantage of using a higher order diffracted beam as the modulated beam is that contrast can be significantly improved over the case where the zero order beam is used. The disadvantage is that the efficiency is degraded since when choosing one of the first order beams 76 or 78, the efficiency is at best 50%. Schemes for combining multiple higher orders to improve efficiency are known but are undesirably complex for many applications.

Figure 4:
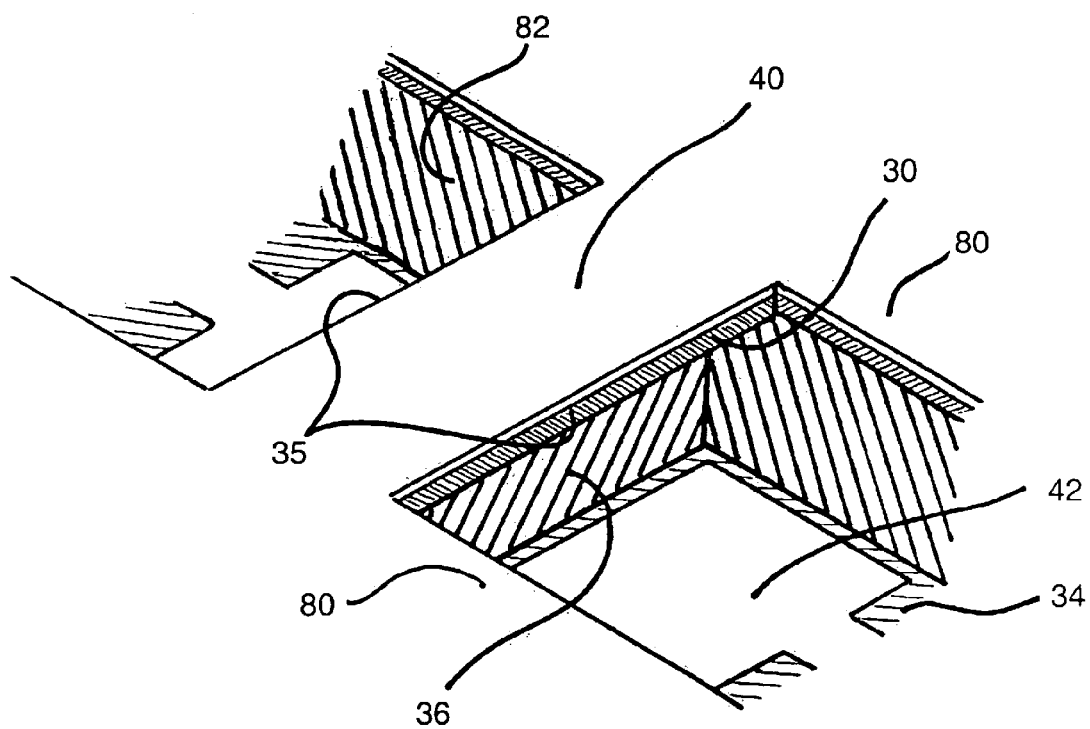
FIG. 4 is a perspective view of another embodiment of the invention.

In a deformable mirror element according to an alternative embodiment depicted in FIG. 4, ribbon member 30 is attached along one edge to pedestal 36 and at its ends to a frame 80 defined by sidewalls 82. One edge 81 of each wing 35 is free. As in previously described embodiments the element has a conductive/reflective layer 40 on ribbon member 30 and an electrode 42 formed on substrate 34. The additional sidewall constraint to the ribbon member strengthens wings 35 and further increases its natural resonance frequency while still permitting elastic deformation of a central portion of wings 35.

For a ribbon member 30 having a length significantly greater than its width the deflection is quite adequate and the geometry of the element can be optimized to provide a very high frequency device. The sidewall constraint only marginally tightens incident beam alignment requirements over the embodiments of FIGS. 2c and 2d since the incident illumination (not shown) may be focused over a small central portion of ribbon member 30. In the actuated state, the central portions of wings 35 essentially form a sawtooth grating as depicted in FIG. 3c. Because the ribbon members 30 are elongated the effect of the additional sidewall constraint is minimal in control portions of members 30. On the other hand, the advantage in improved response time and ease of fabrication can be considerable.

Figure 5:
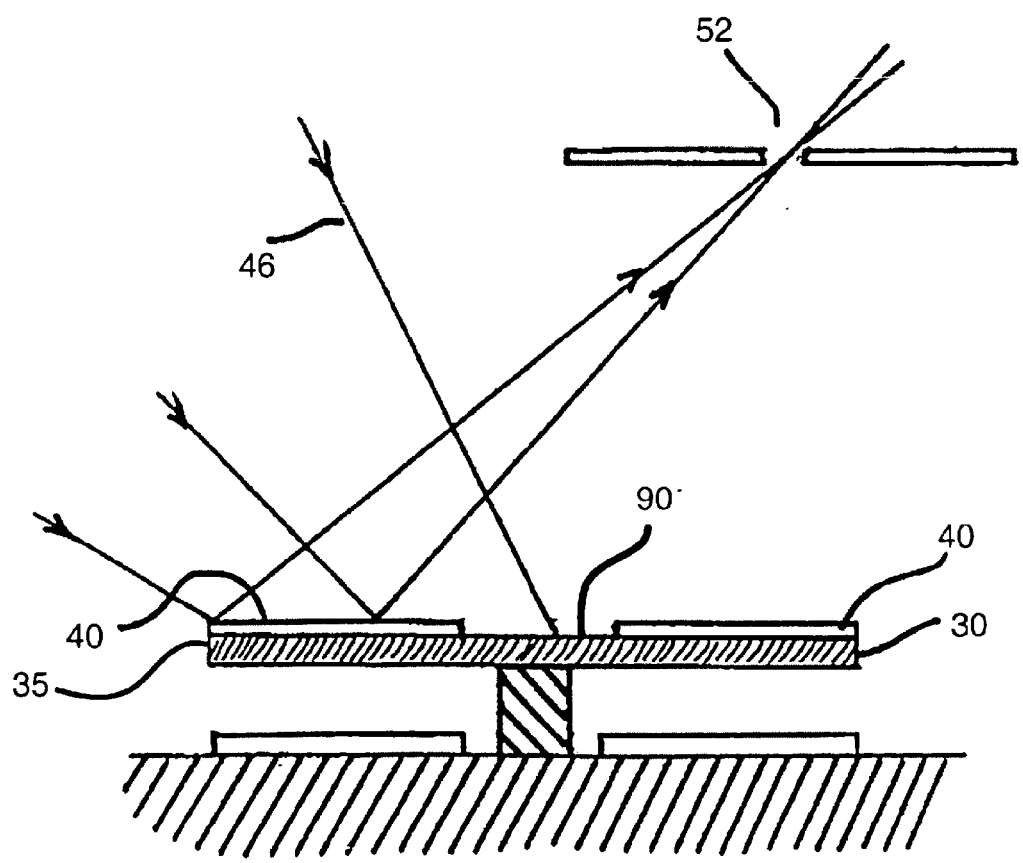
FIG. 5 is a perspective view of yet another embodiment of the invention.

In another embodiment, depicted in FIG. 5, reflective layer 40 is coated over only the deformable portions of ribbon member 30. A central area 90 over pedestal 36 is not coated. In the illustrated embodiment, area 90 has the form of a longitudinal stripe along ribbon member 30. If area 90 were coated with reflective layer 40, it would reflect impinging light directly through aperture 52 whether or not the ribbon member 30 is deformed. By not coating reflective material in area 90, incident ray 46 is only reflected by the material of ribbon 30 which may be chosen to be non-reflective or only weakly reflective at the wavelength of the incident light. This arrangement improves the modulation contrast. A drawback of this construction is that the absorbed light generates heat in ribbon member 30 and/or pedestal 36, which may be a problem in high power applications.

The embodiment shown in FIG. 5 also enables independent operation of each wing 35 by providing two reflective and conductive layers 40, which can each be connected to an independent drive voltage. Wings 35 may then be separately actuated.

EXAMPLE

A 120 channel device was fabricated for use at a wavelength of 830 nm with each channel comprising 4 deformable mirror elements. The wing portions were each 20 $\mu$m×300 $\mu$m. The substrate was 0.6 $\mu$m thick silicon with a metal ground electrode deposited on the underside thereof. A layer of poly-silicon approximately 0.4 $\mu$m thick was deposited over the silicon substrate. The ribbon material layer was silicon nitride deposited 0.6 $\mu$m thick over the poly-silicon layer. A thin layer of gold was deposited over the ribbons to act as the conductive/reflective layer.

Patterning and etching processes were used to form elements with wings attached along three sides as shown in FIG. 4. The upward deformation in the absence of a voltage was of the order of 50 nanometers and a bias voltage of around 28 V was required to bring the elements into the generally planar un-actuated condition. The deformable mirror elements were spaced apart by a distance such that, with the elements in the un-actuated condition, edges of the wings of adjacent elements were separated by about 0.5 $\mu$m.

Sets of four elements were connected together as independent channels by conventional wirebonding. A voltage of around 40 V was applied between the electrodes to actuate the elements into the snap down condition. On removing the voltage, the wings were indirectly monitored by observing the diffraction of a beam of light impinging on the element to establish the transient behavior of the wing. The natural resonance frequency of the ribbon member was determined to be in the region of 1.9 MHz.

The natural frequency of the device is a matter of design and may be determined by a choice of dimensions, including the thickness and span of the ribbon, and the materials employed, including their particular properties such as deposition-induced stress.

Figure 6:
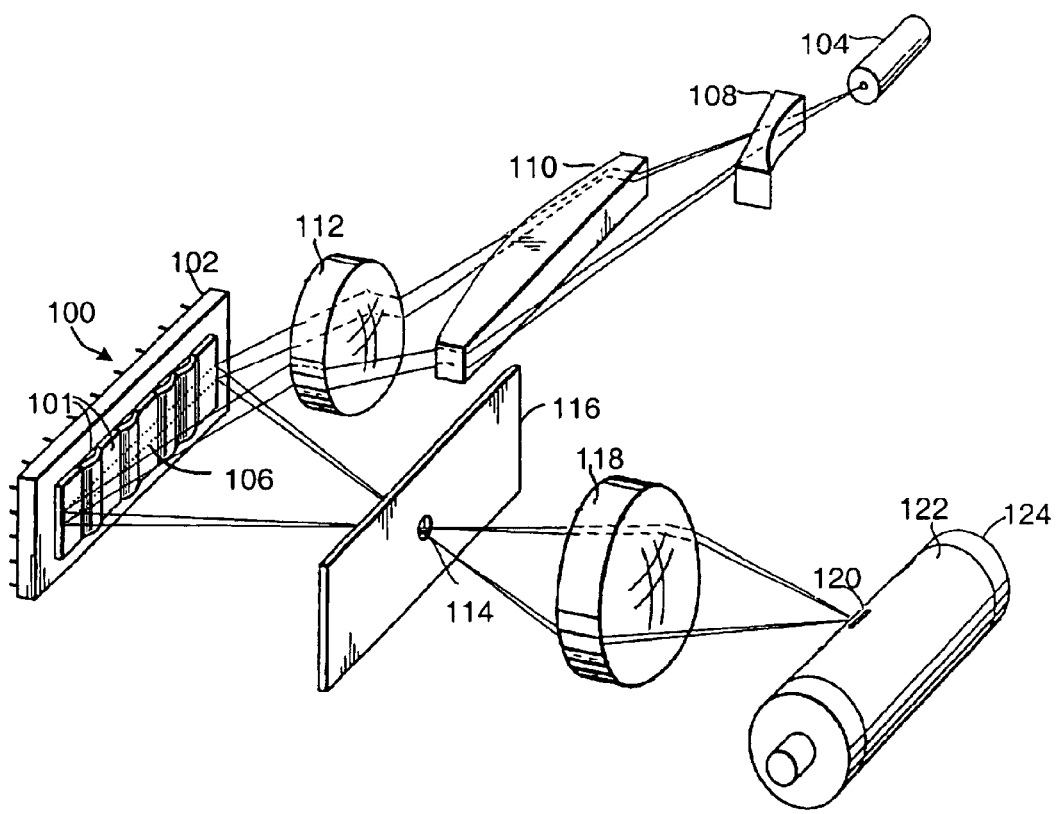
FIG. 6 is a schematic view of a laser imaging system.

The present invention is of particular application in at least two areas: laser imaging, particularly with near IR high power lasers, and projection displays. By way of example, a system making use of an embodiment of the present invention for imaging a media is shown in FIG. 6. A linear light valve array 100 comprising a plurality of deformable mirror elements 101 is fabricated on a silicon substrate 102. Each energized element 101 takes the form of a deformable mirror 30 operating by the principles outlined herein.

A laser 104 generates an illumination line 106 using an anamorphic beam expander comprising cylindrical lenses 108 and 110. U.S. Pat. No. 5,517,359 to Gelbart describes one method for forming illumination line 106. A lens 112 focuses the laser illumination through aperture 114 in aperture stop 116 when the elements 101 are in their flat un-actuated state. The illumination line 106 is laterally spread across the plurality of elements 101 of linear light valve array 100 so that each of the elements 101 is illuminated by a portion of illumination line 106.

When any particular element 101 is un-activated, (i.e. a bias voltage is applied and the reflective surface of the element is flat) aperture 114 transmits light from that ribbon. Light from activated ribbons is blocked by aperture stop 116. An imaging lens 118 forms an image 120 of light valve 100 on a light sensitive material 122, mounted on a drum 124.

The embodiments described above have focused on the use of deformable mirror elements as light valves wherein light is switched between an "on" and an "off" state. Alternatively the invention may also be employed in situations where intermediate states are required by controlling either the degree of deflection of individual ribbons or by controlling the number of ribbons in an array that reflect light through the aperture at any time.

In the case where an array of deformable mirror elements is illuminated by a line that is not homogenous, a correction may be applied to avoid resulting artifacts at the imaging media. Laser line sources are particularly difficult to manufacture, typically suffering from both changing intensity along the line and/or a thickening at either the end or the central portion. In the brightfield mode, light passes through the aperture to the imaging media in the un-actuated state corresponding to the application of a bias voltage. By adjusting the bias voltage to each element, or groups of elements, the transmitted beams from the elements may be balanced to produce a homogenous imaging line at the imaging media. This equates to selectively adjusting the ribbons so that they are not flat as previously depicted in FIG. 2c, but rather in-between the states shown in FIGS. 2c and 2b. By adjusting the bias voltages one can selectively attenuate certain beams, thus adjusting the individual beam channels to some pre-determined level.

In an alternative embodiment shown in FIG. 7-A, a deformable mirror element 140 has a pedestal 36 formed on a substrate 34. An elongate ribbon 30 is supported on pedestal 36 as previously described. In this embodiment however, ribbon 30 is segmented into a plurality of individual wing portions 142 by slits 141. Slits 141 enable individual wing portions 142 to flex independently of each other. A plurality of first electrodes 146 are formed on the substrate 34. In this embodiment each individual wing portion 142 has an associated electrode 146. Ribbon 30 is conductive or has a conductive layer deposited thereon (not shown). The conductive layer functions as a second electrode for all individual wing portions 142 and is connected to a common terminal 144.

Referring now to FIG. 7-B, an individual wing portion 142a is actuated by applying a voltage between common terminal 144 and electrode 146a. Similarly, individual wing portion 142b is actuated by applying a voltage between common terminal 144 and electrode 146b. In practice since elements 142a and 142b are generally actuated in tandem, electrodes 146a and 146b may both be connected to the same terminal 148 or the electrodes may be otherwise interconnected on the substrate 34. Alternate tandem pairs of elements 142a, 142b and 142e, 142f are actuated as shown to form a diffraction grating. Elements 142c, 142d and 142g, 142h remain un-actuated. In contrast to previously described embodiments the deformable mirror element 140 is capable of creating a grating running transverse to the direction of pedestal 36.

In FIG. 8 an array 150 of deformable mirror elements 140 are formed on a common substrate 152. An illumination source 154 is disposed to illuminate array 150 over substantially its entire area. For illustrative purposes the illumination is shown bounded by rays 156 but it should be understood that the array 150 is illuminated by a large plurality of such light rays over substantially its entire area. In FIG. 8, alternate individual wing portions 142 are shown switched in the actuated state producing a diffraction grating at the surface of array 150. The diffraction grating separates illumination beams 156 into multiple reflected diffraction orders of which the zero order beam 158 and two first order beams 160 and 162 are shown. First order beams 160 and 162 become spatially separated from zero order beams 158 at some distance from the array 150, allowing operation in either the brightfield or darkfield mode as desired.

Illumination beam 154 is preferably produced by a uniform broad area source such as a vertical stack of laser diode bars emitting at a suitable wavelength. An example of such vertical stack is sold by Spectra-Physics of Tuscon, Ariz. under the name of ProLite™. The stack is made up of up to 12 water cooled bar diodes spaced apart by as little as 1.8 mm and offering up to 600W of total illumination power in a rectangular format. Alternatively, the illumination beam 154 may be provided by a lamp or any other suitable source.

Figure 9:
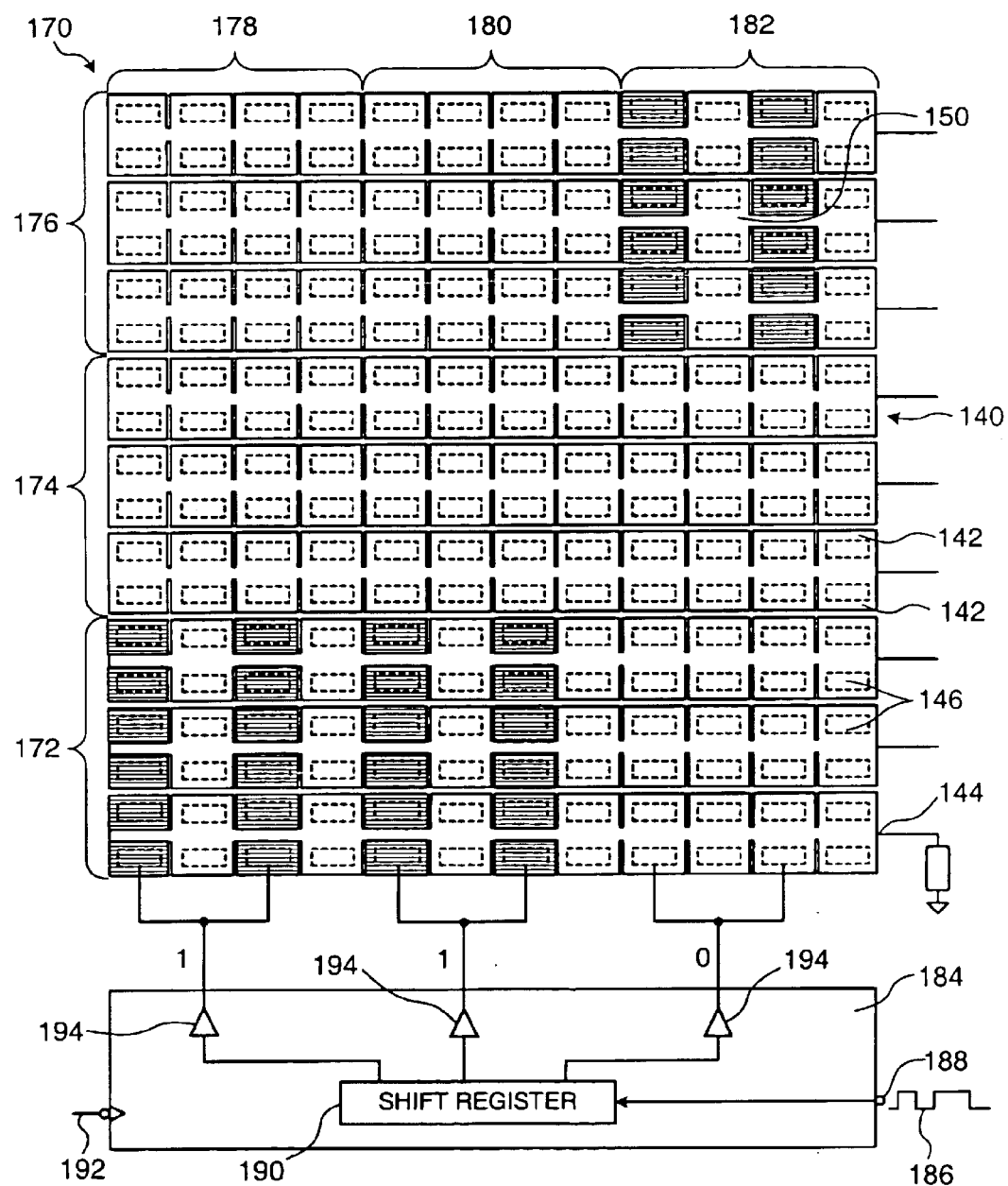
FIG. 9 is a schematic plan view of a light valve and driver.

In practice a plurality of arrays 150 are used to make up a light valve in one or two dimensions. In FIG. 9 a two dimensional light valve device 170 comprises nine arrays. The arrays are in rows 172, 174 and 176 and columns 178, 180 and 182. Array 150 is cross referenced by row 176 and column 182. Each of rows 172, 174 and 176 are comprised of three elongated deformable mirror elements 140. Each deformable mirror element 140 has twelve tandem pairs of individual wing portions 142 and a common electrode connection 144. In this embodiment common electrode connection 144 is connected to ground. In practice many other configurations are possible, that shown in FIG. 9 being just one such example.

Individual wing portions 142 are actuated by a driver 184. Driver 184 receives a serial data stream 186 at input 188. The data stream 186 is clocked into a shift register 190. When strobe line 192 is asserted the data in shift register 190 is placed on the inputs to drivers 194, which in turn actuate individual wing portions 142 by applying a voltage between common electrode connection 144 and electrodes 146. Clearly each driver 194 may be used to drive a plurality of individual wing portions in parallel so that the cross referenced cell is actuated as a whole.

Driver 194 may be adapted to take advantage of the fact that while the individual wing portions 142 may need a relatively high voltage to switch from the un-actuated to the actuated state, when operating in the snap-down mode the wing may be held snapped down by a reduced holding voltage. As an example a wing that requires 20V to snap down may be held in the snapped down position even if the applied voltage is reduced to 10V. Furthermore, should the data for any particular array not change state when the light valve is refreshed, driver 194 can be further adapted to continue to apply the hold voltage i.e. driver 194 only responds to a change in state for the elements it is driving. Note that each row 172, 174 and 176 will require a driver. A further driver (not shown) must be provided to in order to actuate the array 150 (cross referenced by row 176 and column 182).

Note that in some cases where there is stiction between the substrate and the individual wing portion in the snap down mode the hold voltage may be zero volts i.e. even when the voltage is removed the element remains in the snapped down condition. Stiction is a common problem in deformable mirror devices that operate in snap down mode. Surface energy forces that come into play between wings 142 and the substrate may prevent the element from releasing under only the restoring force of the wing compliance, even when the hold voltage is removed. The stiction problem may be addressed by coating the substrate with a low surface energy monolayer in the area where the elements contact the substrate. Another solution is to form a plurality of protrusions on the substrate surface so that the wing element never directly contacts the surface. Yet another possibility is to apply a common high voltage to both electrodes so that the like charged electrodes are forced apart although in this alternative a more complex driver is required.

While each individual wing portion 142 in FIG. 9 has an electrode 146 associated with it, in the mode of operation described thus far only every second electrode is actually used. A diffraction grating by nature requires that some elements be actuated while others remain in the un-actuated condition. In applications where it is important to maintain a very uniform illumination from each array 150, non-uniformities in the incident illumination may make it necessary to provide a mechanism for balancing the output across array elements (rows and columns). This may be provided as previously described, by providing a bias actuation to each element in the un-actuated state to reduce the un-actuated output where bright spots occur. In this case drivers 194 are further adapted to provide some means of applying a small bias voltage in the un-actuated state to each individual wing portion 142. Should balancing not be required, obviously only wing portions that will be actuated require electrodes 146.

Advantageously, the deformable mirror element depicted in FIG. 7-A may be fabricated with very marrow elements 142. The center-to-center distance between individual wing portions 142, shown as d in FIG. 7-A, may be reduced to permit the creation of a very fine diffraction grating. Prior art devices such as that described in U.S. Pat. No. 6,307,663 to Kowarz may be more constrained as to the minimum size element that can be fabricated due to their physical configuration. In reducing the grating pitch d for a diffraction grating, the diffraction orders are sharpened making it easier to perform spatial filtering to extract the desired order. Improved spatial filtering will generally improve the system contrast since the orders are more distinctly separated with very little overlap.

The aforementioned embodiments of the present invention are all described in relation to the employment of an electrostatic force between the electrodes to induce the flexing in the ribbons. The flexing may also be induced by a magnetic force. In an alternative embodiment, the force is applied by forming microlithographically defined current-carrying coils on the ribbons, and deflecting the ribbons by placing the device in a magnetic field and changing the current through the microlithographic coils.

In the described embodiments, the reflective layer and/or electrode layers are metals such as aluminum or gold. Alternatively, the reflective layer may be a dielectric coating suitable for the chosen incident light wavelength(s). Conveniently, when a metallic material is used for the reflecting layer the layer also may serve as an electrode but this is not mandated. The reflecting layer need not be highly conductive. An electrode layer may be a separate layer. The electrodes may also be formed by doping areas of the silicon substrate or ribbons to make them conducting.

As will be apparent to those skilled in the art in light of the foregoing disclosure, many alterations and modifications are possible in the practice of this invention without departing from the spirit or scope thereof. For example:

Wings 35 are not necessarily rectangular. If wings 35 are not rectangular then their widths may vary as long as their maximum 5 widths are significantly smaller than their lengths.

Elongate supports 36 are not necessarily solid and unbroken. Supports 36 could be penetrated by apertures or have gaps as long as these do not prevent supports 36 from supporting wings 35 substantially along their lengths.

What is claimed is:

1. A deformable mirror element for modulating an incident beam of light, the element comprising:
   a substrate;
   an elongate support extending along the substrate and projecting outwardly therefrom, and
   a ribbon member, attached to the elongate support along a longitudinal portion of the ribbon member and extending transversely from the elongate support; and
   at least one slit formed transversely in the ribbon member, the slit for dividing the ribbon member into at least two reflective wing portions, the wing portions being elastically deformable towards the substrate on application of an actuation force.

2. A deformable mirror element according to claim 1, wherein a natural frequency of vibration of the reflective wing portions is at least 500 KHz.

3. A deformable mirror element according to claim 1, wherein a natural frequency of vibration of the reflective wing portions is at least 1 MHz.

4. A deformable mirror element according to claim 1, comprising a first electrode and a second electrode, the first electrode located on the substrate and associated with at least one of the individual wing portions, the second electrode on the ribbon member, whereby the at least one individual wing portion is drawn toward the substrate by the application of a voltage between the first and second electrodes.

5. A deformable mirror element according to claim 4, comprising a plurality of first electrodes, each electrode being associated with an individual wing portion.

6. A deformable mirror element according to claim 4, wherein the substrate comprises first and second opposite surfaces, the elongate support projecting outwardly from the first surface and the first electrode deposited on the second surface.

7. A deformable mirror element according to claim 4, wherein the second electrode comprises a reflective layer on the ribbon.

8. A deformable mirror element according to claim 4, wherein the individual wing portion is adapted to snap-down into contact with the substrate under application of a voltage between the first and second electrodes that is higher than a snap-down voltage level.

9. A deformable mirror element according to claim 8, wherein the at least one of the individual wing portions is adapted to snap-down into contact with the substrate under application of a voltage sufficient to cause a deformation of the wing to move a free edge of the wing through a distance that is greater than one-third of the spacing between the electrodes.

10. A deformable mirror element according to claim 4, wherein the first electrode comprises a doped area of the substrate.

11. A deformable mirror element according to claim 4, wherein the second electrode comprises a doped area of the ribbon member.

12. A deformable mirror element according to claim 1, wherein at least the individual wing portions of the ribbon member comprise a conductive electrode.

13. A deformable mirror element according to claim 12, wherein the conductive electrode comprises a layer of electrically conductive material deposited on at least the individual wing portions of the ribbon member.

14. A deformable mirror element according to claim 13, wherein the conductive material is reflective at the wavelength of the incident light beam.

15. A deformable mirror element according to claim 1, wherein the elongate support has a height above the substrate of between 0.2 µm and 0.5 µm.

16. A deformable mirror element according to claim 1, used to modulate an incident light beam having a wavelength between 380 nm and 1054 nm.

17. A deformable mirror element according to claim 1, used to modulate an incident light beam having a wavelength between 790 nm and 980 nm.

18. A deformable mirror element according to claim 1, wherein the ribbon member comprises silicon nitride.

19. A deformable mirror element according to claim 18, wherein the ribbon member has a thickness of at least 0.2 µm.

20. A deformable mirror element according to claim 1, wherein the ribbon member extends laterally from either side of the elongate support.

21. A light valve, comprising an array of deformable mirror elements according to claim 1 formed on a common substrate and an electrical connection to each of the deformable mirror elements for applying the actuation force thereto.

22. A light valve according to claim 21, wherein the array is arranged into groups of adjacent deformable mirror elements, each group sharing a common electrical connection and each group defining a individual grating light valve modulation channel.

23. A light valve according to claim 21, comprising means controlling a bias-voltage applied to each of the deformable mirror elements.

24. An apparatus for selectively deflecting a light beam comprising at least one row of spaced-apart deformable mirror elements according to claim 1, the mirror elements arranged with their elongate supports parallel to one another and extending substantially transversely to the row.

25. A method for modulating light, comprising:
   providing a plurality of arrayed deformable mirror elements according to claim 1;
   directing the light onto the wing portions to provide a plurality of reflected light beams;
   elastically deforming selected ones of the wing portions by applying an actuation force thereto;
   spatially filtering the reflected light from the wing portions to provide a plurality of modulated light beams.

26. A method according to claim 25, wherein the individual wing portions are curved away from the substrate when no actuation force is applied and the method comprises flattening out at least some of the wing portions by applying a pre-determined actuation force thereto, the degree of flattening selected to provide the plurality of modulated beams with a substantially uniform intensity.

27. A method according to claim 26, wherein the application of an actuation force greater than the pre-determined actuation force causes the individual wing portion to deflect further toward the substrate into an actuated configuration.

28. A method according to claim 26, wherein the force applied in the actuated configuration is sufficiently large to deform the individual wing portion so that at least an edge thereof snaps down into contact with the substrate.

* * * * *